United States Patent Office 3,020,256
Patented Feb. 6, 1962

3,020,256
UNSATURATED POLYESTER COMPOSITION CONTAINING PHENYL CHLOROPHOSPHONATES TO REDUCE COLOR
Jean Louis Philippe Imer, Chauny, France, assignor to Compagnie de Saint-Gobain, Paris, France
No Drawing. Filed Jan. 3, 1957, Ser. No. 632,262
Claims priority, application France Jan. 16, 1956
8 Claims. (Cl. 260—45.4)

The present invention relates to an improvement in the manufacture of copolymerized polyester resins, a known class of resins which is obtained by copolymerizing unsaturated polyesters with an unsaturated, polymerizable monomer. It is known that such resins are produced by mixing an unsaturated polyester, that is to say one which contains at least a certain proportion of an ester of a polycarboxylic acid of unsaturated type, with an unsaturated monomer which is usually an unsaturated hydrocarbon or an unsaturated ester and copolymerizing the mixture. This copolymerization is usually carried out in the presence of a catalyst and frequently in the presence of an accelerator of catalysis. The copolymerization is carried out in the cold or at elevated temperature, according to the nature of the polymerizable substances and the catalysts employed.

One of the imperfections of the process is that the polymerizable materials usually contain various impurities which, even in traces, produce a distinct coloration in the copolymer and in the polyesters.

It is an object of the present invention to reduce and minimize the effect of these impurities, to reduce the coloration of these resins by such impurities, and to produce such copolymers relatively free of such impurity-induced color.

The objects of the invention are accomplished, generally speaking, by adding to the polyester, before copolymerization, compositions having the formula

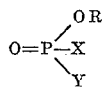

in which R is a monovalent hydrocarbon radical of aliphatic or aromatic class, X is either a halogen or a group OR, and Y is a halogen.

The compounds falling within this class are generally useful for this purpose and this has been affirmatively determined by test, but those which have the formulas

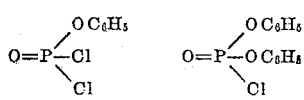

are preferred. Thus, chlorides and aromatic radicals of the benzene series are preferred among these compounds.

The inventor has demonstrated that the incorporation of these compounds, even in amounts as trifling as .001 to .1% by weight of the mixture of polyester and unsaturated monomer, is effective to materially reduce the color of the resin. This advantage is obtained without harmful reduction of the speed of copolymerization. Thus, measuring the coloration on the Hazen scale, one might obtain a color on the order of 60 to 250 with a selected group of raw materials, not using this invention, but using identical raw materials under identical circumstances with this invention would reduce these values to between 10 and 50, while the time necessary to obtain copolymerization would not be increased, even in the most unfavorable circumstances, more than 2 to 3 times.

The following tests are used to measure the copolymerization of such resins:

*Gelling by heat.*—This is the time required to set or gel the resin, that is, to induce a sharp increase in viscosity when the resin is maintained at 80° C. in the presence of .5% of its weight of benzoyl peroxide polymerization catalyst.

*Heating time.*—This is the time necessary to make the resin become hard and begin to crack at 80° C. in the presence of the same amount of the same catalyst. The values in the two above tests are generally measured in minutes and seconds.

*Cold gelling.*—This is the time required to set or gel the resin, that is to induce a sharp increase in viscosity at 25° C., in the presence of 2% of its weight of a solution of methethylketone peroxide at 60% concentration in methyl phthalate. This value is generally expressed in hours.

Finally, an important characteristic of the polyester resins which have not yet been copolymerized is their stability in storage, which is to say, the time during which the resin may be stored in the absence of catalysts after its dissolution in unsaturated monomer without its viscosity being increased appreciably. This storage ability, which is quite high, may be readily measured by an accelerated aging test which involves keeping the resin at 55° C. until its viscosity is sharply increased. This stability is generally expressed in days.

The tests made by the inventor have shown that the time of cold gelling, the time of heating, and the time of hot gelling are increased only a trifle in most cases and, in all cases, only to an extent which is not objectionable, when the decolorizers of this invention are added. On the other hand, the storage stability is also not harmfully affected.

It is also an advantageous feature of the invention that the activity of the usual agents is not harmfully affected by the addition of the decolorizers of this invention; for instance, accelerators and catalysts of the usual types may be used in the ordinary way. However, the inventor has discovered that diethylaminochloroethane chlorhydrate has particularly beneficial results when used as an accelerator in the presence of these decolorants.

*Example 1*

An unsaturated polyester was prepared as follows:
Into a flask provided with a nitrogen inlet tube, an agitator, and a tube for the escape of nitrogen and water vapor, there was placed 296 grams of phthalic anhydride (2 mols), 116 grams of maleic acid (1 mol) and 251 grams of propyleneglycol (3.3 mols). The mass is heated for 3 hours at 160° C. with bubbling of nitrogen at ordinary pressure. The mass is then heated under vacuum of 15 to 18 mm. of mercury with the inbubbling of nitrogen at a temperature of 160 to 170° C., until the acid index of the mass drops below or equal to 35. This required 12 hours. In order to prevent premature polymerization of the polyester, there was added, near the end of the operation, .13 part of hydroquinone for each 1000 parts of the mass. This produced an unsaturated polyester having a relative viscosity on the order of 2 poises. The relative viscosity was measured at 25°, the resin being dissolved in styrene, with a concentration equal to 60% by weight of resin in the solvent.

200 grams of the polyester thus prepared were poured at 160° C. into 122 grams of cold styrene with energetic agitation adequate to keep the temperature between 60 and 70° C. There was thus obtained a polyester resin ready to be copolymerized. The color on the Hazen scale was equal to 170.

An identical sample of the resin was prepared, except that .075% by weight of the compound

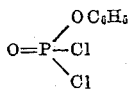

was added and homogenized in the mixture. The resin thus prepared had a coloration of 10 on the Hazen scale, which is practically colorless.

The determination of the time of gelification by heat and the determination of the time of heating were carried out on the two resins hereinabove described and gave respectively 20 min. 30 sec. and 5 min. for the prior art resin, and 19 min. 20 sec. and 5 min. for the novel colorless resin. Gelification in the cold required 1 hour for the prior art resin and 2 hours 30 min. for the novel colorless resin.

The accelerated test of stability in storage gave 27 days for both the prior art resin and for the novel colorless resin.

*Example 2*

A polyester resin was prepared as in Example 1 and produced a Hazen color equal to 200. To another sample of the same resin there was added .038% by weight of the compound

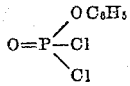

and .025% of its weight of diethylaminochloroethanechlorhydrate as accelerator of catalysis, the mass being homogenized. This produced a novel resin having a Hazen color equal to 30 as distinguished from 200 and, after heating, there was produced a poured plate 3 mm. thick, perfectly transparent and practically colorless.

The time required for gelification by heat and the time required for heating to produce a cracked, hard resin were, respectively, 18 min. 15 sec. and 4 min. 15 sec. for the untreated resin and 20 min. and 5 min. for the novel resin. Cold gelling increased from 1 hour for the control to 2 hours for the novel resin. The accelerated test for shelf life gave in both cases 12 days.

*Example 3*

Example 2 was carried out using .019% of the same decolorant and .025% of diethylaminochloroethanechlorhydrate. The Hazen color test showed a reduction from 200 to 40. The resin was perfectly colorless after the heating test. Hot gelification was 21 min. 30 sec. and heat cracking took 6 minutes longer with the new resin, as against 18 min. 15 sec. and 4 min. 15 sec. respectively for the control. Cold gelification occurred in the same time for both resins, 1 hour. The accelerated shelf life test showed 11 days for the new resin and 12 for the prior art control.

*Example 4*

A polyester was prepared as in Example 1, showing a coloration of 250 on the Hazen scale. To it there was added .1% of its weight of the compound

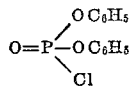

The mixture was homogenized and on the Hazen scale the coloration was equal to 50. By pouring that resin hot, one could produce a plate 3 mm. thick, practically colorless and having excellent transparency, in spite of the relatively large proportion of the decoloring agent. The cold gelification was only increased 3 times and the stability to storage decreased from 16 to 14 days.

This invention produces a new family of resins which differ from their counterparts of the prior art in that they contain small proportions of the decoloring agents described, and that they are relatively free of color. They are clearly distinguishable from their prior art counterparts on the Hazen color scale.

As many apparently widely different embodiments of the present invention may be made without departing from the spirit and scope thereof, it is to be understood that the invention is not limited to the specific embodiments.

What is claimed is:

1. Copolymers comprising polyesters resulting from the reaction of a glycol with a dicarboxylic acid containing an ethylenic unsaturated bond, said polyesters being copolymerized with at least one monomer containing at least one ethylenic double-bond, said copolymerized polyesters containing from 0.001 to 0.1% by weight of the copolymer of a compound having the formula

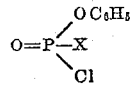

in which X is one of the group consisting of Cl and $OC_6H_5$.

2. Copolymers as claimed in claim 1, in which X is Cl.
3. Copolymers as claimed in claim 1, in which X is $OC_6H_5$.
4. The method of preparing relatively colorless copolymerized polyester resins that comprises copolymerizing a polyester resin prepared from a glycol and a dicarboxylic acid containing an ethylenic double-bond with at least one monomer containing at least one ethylenic double-bond in the presence of 0.001 to 0.1% by weight of the copolymer of a compound of the formula

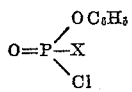

in which X is one of the group consisting of $OC_6H_5$ and Cl.

5. The method as claimed in claim 4, in which X is Cl.
6. The method as claimed in claim 4, in which X is $OC_6H_5$.
7. The method as claimed in claim 4, comprising carrying out said copolymerizing in the presence of a small but effective amount of an accelerator consisting of diethylaminochlorethanechlorhydrate.
8. The method as claimed in claim 7, wherein the diethylaminochlorethanechlorhydrate is present in amounts on the order of .025% by weight.

References Cited in the file of this patent

UNITED STATES PATENTS

| | | |
|---|---|---|
| 2,616,873 | Cass | Nov. 4, 1952 |
| 2,714,100 | Toy et al. | July 26, 1955 |